(12) United States Patent
Jones et al.

(10) Patent No.: US 11,303,486 B2
(45) Date of Patent: *Apr. 12, 2022

(54) SYSTEMS AND METHODS FOR ASYMMETRICAL CYCLIC PREFIXES IN RFOG TRANSMISSIONS

(71) Applicant: Cable Television Laboratories, Inc., Louisville, CO (US)

(72) Inventors: Douglas D. Jones, Boulder, CO (US); Luis Alberto Campos, Superior, CO (US); Thomas Holtzman Williams, Longmont, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 44 days.

This patent is subject to a terminal disclaimer.

(21) Appl. No.: 16/806,969

(22) Filed: Mar. 2, 2020

(65) Prior Publication Data

US 2020/0204416 A1 Jun. 25, 2020

Related U.S. Application Data

(63) Continuation of application No. 16/041,415, filed on Jul. 20, 2018, now Pat. No. 10,581,654.

(Continued)

(51) Int. Cl.
*H04L 27/26* (2006.01)
*H04Q 11/00* (2006.01)

(Continued)

(52) U.S. Cl.
CPC ......... *H04L 27/2607* (2013.01); *H04B 10/27* (2013.01); *H04B 10/548* (2013.01);
(Continued)

(58) Field of Classification Search
CPC ... H04B 10/27; H04B 10/548; H04L 27/2607; H04L 27/2608; H04L 27/2697; H04L 5/0048; H04Q 11/0067; H04Q 2011/0088
(Continued)

(56) References Cited

U.S. PATENT DOCUMENTS

2009/0225741 A1* 9/2009 Wang ............... H04L 27/2605
370/345
2011/0090983 A1* 4/2011 Zhang ............... H04L 27/2607
375/295

(Continued)

*Primary Examiner* — Robert J Lopata
(74) *Attorney, Agent, or Firm* — Armstrong Teasdale LLP

(57) ABSTRACT

A method for transmitting a digital frame by an optical network unit in a digital communications network includes steps of arranging received data into a series of symbols, installing a primary cyclic prefix immediately preceding the series of symbols in time, and inserting individual ones of a plurality of secondary cyclic prefixes between each adjacent pair of symbols in the series of symbols. A length of each secondary cyclic prefix corresponds to a first duration shorter than an amount of time needed to turn on a laser of the optical network unit. The method further includes a step of providing to the optical network unit the digital frame. The digital frame includes the primary cyclic prefix, the plurality of secondary cyclic prefixes, and the series of symbols. The method further includes a step of modulating the provided digital frame by a laser of the optical network unit.

19 Claims, 2 Drawing Sheets

Related U.S. Application Data

(60) Provisional application No. 62/534,945, filed on Jul. 20, 2017, provisional application No. 62/534,953, filed on Jul. 20, 2017.

(51) Int. Cl.
  *H04B 10/27* (2013.01)
  *H04L 5/00* (2006.01)
  *H04B 10/548* (2013.01)

(52) U.S. Cl.
  CPC ........ *H04L 5/0048* (2013.01); *H04L 27/2608* (2013.01); *H04L 27/2697* (2013.01); *H04Q 11/0067* (2013.01); *H04Q 2011/0088* (2013.01)

(58) Field of Classification Search
  USPC .......................................................... 370/389
  See application file for complete search history.

(56) References Cited

U.S. PATENT DOCUMENTS

| | | | | |
|---|---|---|---|---|
| 2012/0033589 A1* | 2/2012 | Zheng | ................... | H04W 99/00 |
| | | | | 370/280 |
| 2014/0226738 A1* | 8/2014 | Plevel | ............... | H04L 25/03159 |
| | | | | 375/261 |
| 2014/0314410 A1* | 10/2014 | Mumtaz | ............. | H04B 10/2581 |
| | | | | 398/65 |
| 2016/0020842 A1* | 1/2016 | Li | ........................ | H04B 7/0617 |
| | | | | 370/329 |
| 2016/0072578 A1* | 3/2016 | Jin | ...................... | H04L 43/0882 |
| | | | | 398/36 |
| 2016/0112238 A1* | 4/2016 | Ling | ..................... | H04L 27/362 |
| | | | | 375/261 |
| 2016/0182153 A1* | 6/2016 | Wu | ................... | H04B 10/2575 |
| | | | | 398/45 |
| 2016/0197804 A1* | 7/2016 | Zinevich | ................ | H04L 43/08 |
| | | | | 370/252 |
| 2016/0277913 A1* | 9/2016 | Harada | ............. | H04W 72/048 |
| 2016/0294595 A1* | 10/2016 | Harada | ............. | H04L 27/2646 |
| 2016/0301555 A1* | 10/2016 | Nory | ...................... | H04L 5/001 |
| 2017/0237491 A1* | 8/2017 | Mutalik | ........... | H04B 10/25751 |
| | | | | 398/115 |
| 2017/0244586 A1* | 8/2017 | Yoo | ...................... | H04W 72/042 |
| 2017/0265106 A1* | 9/2017 | Andreoli-Fang | ............................ | |
| | | | | H04W 72/1268 |
| 2018/0054268 A1* | 2/2018 | Abdoli | .................. | H04L 27/264 |
| 2018/0198584 A1* | 7/2018 | Sanderovich | ......... | H04L 5/0048 |
| 2019/0223118 A1* | 7/2019 | Tomeba | ................ | H04L 5/0091 |
| 2019/0288894 A1* | 9/2019 | Boudreau | ............. | H04W 16/14 |
| 2019/0296955 A1* | 9/2019 | Akkarakaran | ...... | H04L 27/2636 |
| 2019/0306855 A1* | 10/2019 | Tiirola | ............. | H04W 72/0446 |
| 2019/0380155 A1* | 12/2019 | Ren | ................... | H04W 74/0833 |
| 2020/0083995 A1* | 3/2020 | Suzuki | ................. | H04L 5/1469 |

\* cited by examiner

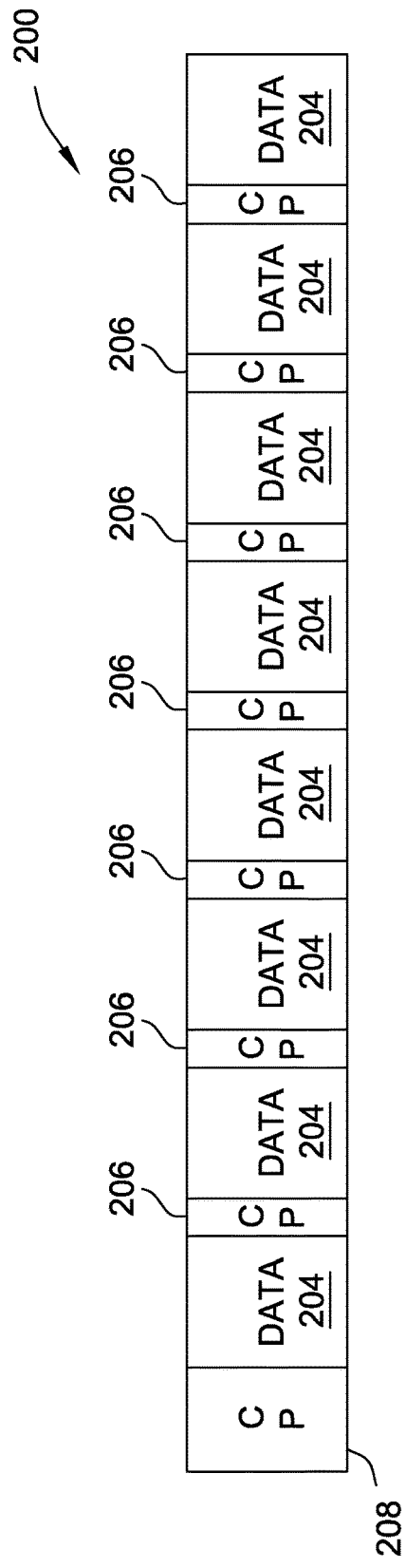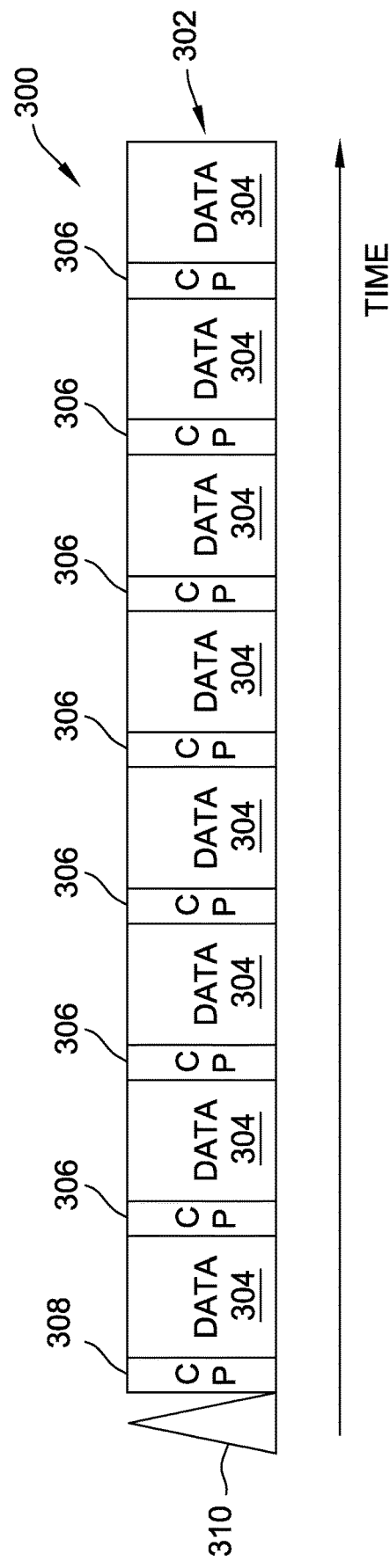

US 11,303,486 B2

SYSTEMS AND METHODS FOR ASYMMETRICAL CYCLIC PREFIXES IN RFOG TRANSMISSIONS

CROSS REFERENCE TO RELATED APPLICATIONS

This application is a continuation of U.S. application Ser. No. 16/041,415, filed Jul. 20, 2018, now U.S. Pat. No. 10,581,654, which prior application claims the benefit of and priority to U.S. Provisional Patent Application Ser. No. 62/534,945, filed Jul. 20, 2017, and to U.S. Provisional Patent Application Ser. No. 62/534,953, filed Jul. 20, 2017, the disclosures of which are herein incorporated by reference in their entireties.

BACKGROUND

The field of the disclosure relates generally to digital transmission systems, and more particularly, to multi-carrier wired, wireless, and optical digital transmission systems utilizing cyclic prefixes.

Conventional digital transmission systems typically include both linear and non-linear distortion. However, for the purposes of the following discussion, use of the term "distortion" is generally intended to refer to linear distortion only. Some conventional digital transmission systems utilize orthogonal frequency division multiplexing (OFDM) and orthogonal frequency division multiple access (OFDMA) techniques for transmitting carrier signals using technology such as the Data Over Cable Service Interface Specification (DOCSIS), or DOCSIS version 3.1, as well as other wireless standards. OFDM implements a plurality of different sub-carriers that are harmonics of a fundamental to obtain orthogonality. DOCSIS specifications typically utilize OFDM for downstream signals and OFDMA for upstream signals, and OFDM and OFDMA are complimentary.

One type of conventional digital transmission system is Radio Frequency over Glass (RFoG). RFoG is defined by the Society of Cable Telecommunications Engineers (SCTE) in SCTE 174, and transmits DOCSIS RF signals to a home, or customer premises, over fiber optics. RFoG allows cable operators to use existing Modem Termination Systems (MTS) to transmit RF over a passive optical network (PON) architecture to a modem (e.g., an optical network unit (ONU), a cable modem (CM), etc.), at the home/customer premises. The fiber optic transmission lines used in RFoG provide greater downstream and upstream bandwidth than then conventional coaxial cables. RFoG typically reduces operational expenses by allowing the substitution of passive components (e.g., splitters) for active components (e.g. amplifiers), thereby reducing the power requirements for the system, but also the reach of the system.

Both OFDM and OFDMA are known to use cyclic prefixes (CPs) in the data blocks of a transmitted digital signal. The cyclic prefix functions as a "guard time" that separates data bursts, and that allows any micro-reflection from one burst to die out before the next burst is received, thereby eliminating interference from one block to the next. CPs are commonly used in hybrid fiber coaxial (HFC) networks, where reflections are frequently known to occur, and various durations of CPs are utilized to accommodate the variety of reflections that may occur therein, thereby significantly increasing the overhead of the HFC network, because the CPs do not carry useful customer information (i.e., customer data). The CPs provide block-to-block isolation between the data block bursts of digital information, but CPs require additional resources to transmit the extra data that constitutes the CP. Such required CP data reduces the bandwidth efficiency of transmissions, thereby limiting the amount of data that can be transmitted within a given frequency band, while also requiring additional power and decreasing the battery life of system components.

DOCSIS 3.1 transmissions over an HFC network utilize a single value for an upstream CP, and the length of this single value CP is set to accommodate the longest micro-reflection that will be observed on the coaxial cable(s) of the HFC network. DOCSIS 3.1 transmissions over an RFoG network, on the other hand, require that the CP length is set long enough to activate an ONU laser of the RFoG network (sometimes referred to as an R-ONU). The RFoG ONU is typically located at the customer premises, and serves as the transport layer for RF video, voice, and DOCSIS technologies in deep fiber and fiber-to-the-home (FTTH) access networks. In many instances, the ONU also functions as or substitutes for a modem/CM. As defined in SCTE 174, where the upstream RFoG ONU laser requires 1.3 microseconds ($\mu$s) to activate and stabilize (the ONU is "always-on" downstream), upstream DOCSIS 3.1 transmissions over a RFoG network requires the upstream cyclic prefix to be greater than 1.3 $\mu$s, for the first symbol, to activate and stabilize the ONU laser. That is, within 1.3 $\mu$s, the RFoG ONU should reach and maintain steady-state stability upon turn-on.

FIG. 1 illustrates a timing diagram 100 for a conventional data burst 102 in an RFoG ONU. Timing diagram 100 depicts turn-on and turn-off durations of burst 102 such that a cyclic prefix (not shown) is generated to be long enough to accommodate the duration T1 of the leading edge of burst 102 (i.e., 1.3 $\mu$s). The T1 thus corresponds to the maximum time after application of a valid turn-on of the RF input in which an optical modulator of the ONU should achieve and maintain RF signal level stability within ±0.1 dB (e.g., observed at the output of a reference optical-to-electrical converter, not shown). The T1 duration is also considered sufficient to reach and maintain performance requirements of the noise power ratio (NPR). However, this large of and upstream CP length is wasteful of upstream transmission capacity, since the length is determined by the amount of time needed to turn-on the RFoG ONU in the first burst, but which is not needed in subsequent bursts when the ONU is already on.

BRIEF SUMMARY

In an embodiment, a method is provided for transmitting a digital frame by an optical network unit in a digital communications network. The method includes steps of arranging received data into a series of symbols, installing a primary cyclic prefix immediately preceding the series of symbols in time, and inserting individual ones of a plurality of secondary cyclic prefixes between each adjacent pair of symbols in the series of symbols. A length of each secondary cyclic prefix corresponds to a first duration shorter than an amount of time needed to turn on a laser of the optical network unit. The method further includes a step of providing to the optical network unit the digital frame. The digital frame includes the primary cyclic prefix, the plurality of secondary cyclic prefixes, and the series of symbols. The method further includes a step of modulating the provided digital frame by a laser of the optical network unit.

In an embodiment, an optical network unit (ONU) for a digital transmission system is provided. The ONU includes an input portion configured to receive digital data, a processor configured to form the received digital data at least one data frame including a series of data blocks, a laser configured to modulate the at least one data frame is a digital signal for transmission over the digital transmission system, and a modem portion in operable communication with the processor and the laser, and configured to transmit the at least one data frame to the digital transmission system The at least one data frame further includes a primary cyclic prefix preceding the series of data blocks and a plurality of secondary cyclic prefixes each respectively disposed between adjacent ones of the series of data blocks. A length of each of the secondary cyclic prefixes has a shorter duration than an amount of time needed to turn on the laser.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 2 is a schematic illustration depicting an exemplary data structure of an OFDMA frame, according to an embodiment.

FIG. 3 is a schematic illustration depicting an exemplary data structure of an OFDMA frame, according to an alternative embodiment.

Figure 1:
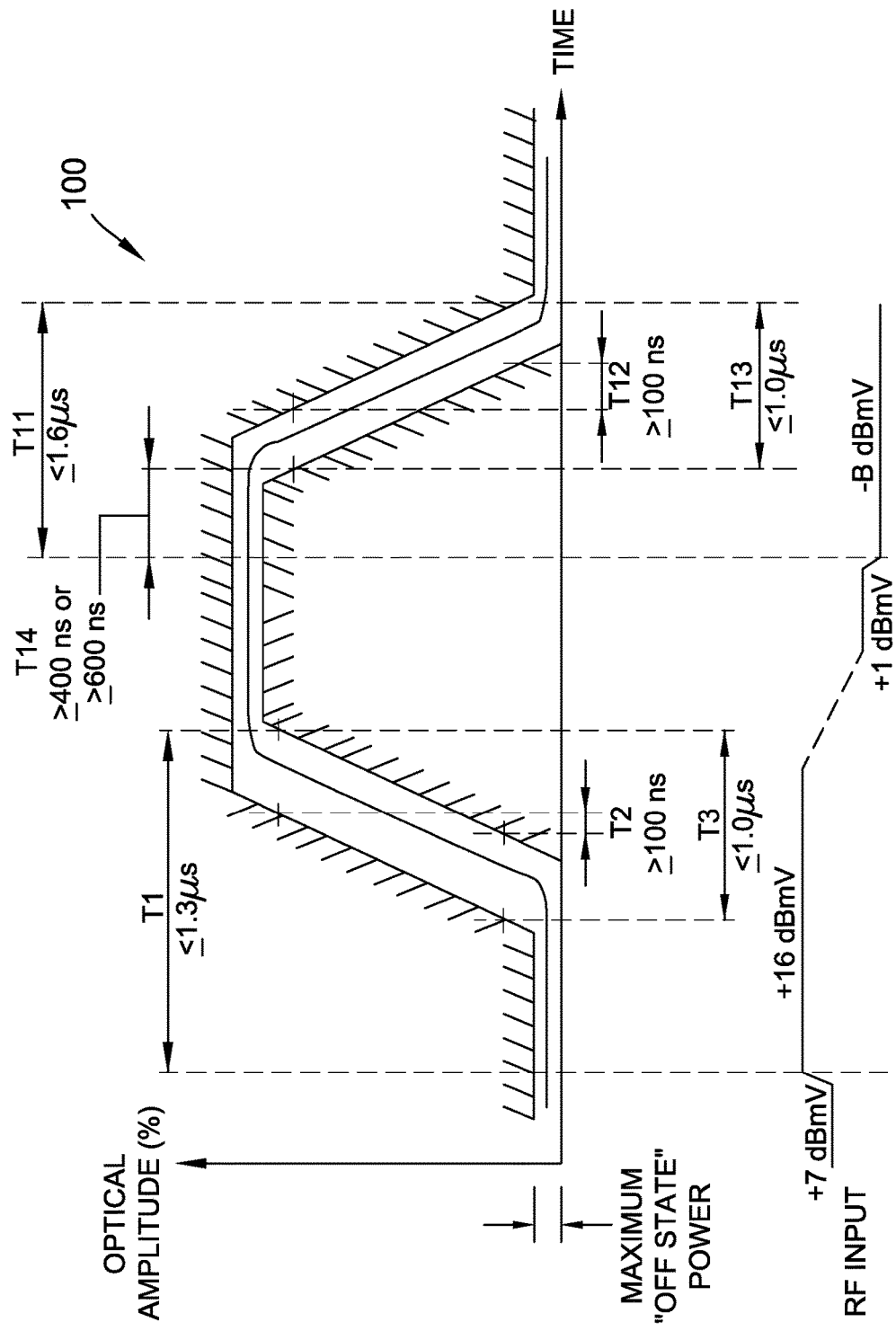
FIG. 1 illustrates a timing diagram for a conventional data burst in an RFoG ONU.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, systems and methods are provided for reducing the CP length in the upstream transmissions. In an exemplary embodiment, the present techniques are implemented by a modem of an RFoG network in an upstream OFDMA transmission. The RFoG modem and RFoG ONU may, for example, be integrated components of a single device, or may represent two separate elements of the system. In some embodiments, the present techniques may be implemented by an MTS (or other control device within the network) and are applicable to other types of digital transmission networks and/or downstream digital transmissions, where desired. The present embodiments advantageously reduce the CP length between data blocks in an OFDMA frame at the ONU by (i) generating a primary CP to proceed the OFDMA frame, and secondary CPs of shorter lengths before all subsequent data blocks in the frame, or (ii) transmitting an activation tone to the ONU prior to transmission of OFDMA frame symbols. In either alternative, shorter CPs may be implemented between substantially all data blocks of an upstream OFDMA frame, thereby rendering the upstream transmission significantly more efficient.

FIG. 2 is a schematic illustration depicting an exemplary data structure 200 of an OFDMA frame 202. Data structure 200 depicts a "time slice" of an upstream DOCSIS 3.1 transmission. In the exemplary embodiment, OFDMA frame 202 includes a plurality of data blocks 204, and a plurality of secondary CPs 206 between adjacent data blocks 204. A primary CP 208 precedes OFDMA frame 202, that is, in front of the first of data blocks 204 in time.

In an exemplary embodiment of data structure 200, primary CP 208 has a length sufficient to allow an RFoG ONU laser to turn-on (e.g., 1.3 μs according to SCTE 174), but for all subsequent upstream symbols, CPEs 206 have a shorter length, since the ONU laser is already on for OFDMA frame 202. By implementing shorter CPs in between subsequent symbols/data blocks 204 in a burst, a significant amount of upstream capacity can be regained. That is, by implementing two different CPs—a "long" primary CP 208 and short secondary CPs 206—the efficiency of the upstream transmission is significantly increased.

As illustrated in FIG. 2, data structure 200 thus represents a modification to the DOCSIS 3.1 specification that presently provides for a single CP in the upstream transmission for all symbols. According to this embodiment, the "single" upstream CP (e.g., secondary CP 206) may be significantly shortened by providing an additional, longer CP (e.g., primary CP 208) in front of the OFDMA frame. In at least one embodiment, primary CP 208 is not necessarily a different CP from secondary CP 206, but instead may represent two or more instances of secondary CP 206 immediately adjacent one another. This embodiment is of particular advantageous use in RFoG networks, where the most significant limitation on the length of the CP will be experienced prior to the first data block of an OFDMA frame.

This embodiment will nevertheless have some additional usefulness in an HFC network where the CP length needed to accommodate micro-reflections is less than 1.3 μs. As described above, the CP for HFC networks are constant. On the HFC network, the CP primarily functions as a guard time (or "dead time") in between symbols/blocks to allow the dominant micro-reflection to die out so that micro-reflection will not interfere with the next symbol. RFoG does not experience the micro-reflections of HFC, and thus the RFoG CP (primarily to activate the ONU laser) is used for different purposes then the HFC CP. Nevertheless, the present techniques contemplate dominant micro-reflections having durations shorter than the time needed to activate the ONU laser.

This dual-CP technique addresses a different problem than the variable-length CP proposals for a conventional Ethernet Passive Optical Network (EPON) protocols and an EPON protocol implemented over coax (EPoC), which utilizes one CP for device registration, and a different CP for regular data transfer. These conventional proposals do not contemplate using a different CP before an OFDMA frame than the CPs between symbols/blocks of the frame. The embodiment depicted in FIG. 2 is a further particular value to cable operators running DOCSIS 3.1 upstream over RFoG, which is becoming more common as operators are building FTTH for Greenfield construction, but are presently required to run RFoG over these fibers. Data structure 200 may be implemented by a modem or modem portion of the ONU at the customer premises (or by a processor thereof), or alternatively may be controlled by the MTS.

FIG. 3 is a schematic illustration depicting an exemplary data structure 300 of an OFDMA frame 302. Similar to data structure 200, FIG. 2, data structure 300 also depicts a "time slice" of an upstream DOCSIS 3.1 transmission, and OFDMA frame 302 similarly includes a plurality of data blocks 304, a plurality of secondary CPs 306 between adjacent data blocks 304, and a primary CP 308 preceding OFDMA frame 302 in time. Data structure 300 differs from data structure 200, however, in that primary CP 308 and secondary CPs 306 may be of the same length. In the exemplary embodiment, where primary CP 308 has the same length as secondary CP 306, the modem is configured to transmit a continuous wave (CW) tone 310 to activate the RFoG ONU laser prior to transmitting the symbols/data blocks 304 of OFDMA frame 302.

That is, in exemplary utilization of data structure 300, the modem is configured to activate the RFoG ONU (i.e., by CW tone 310) before the modem begins transmitting customer data. Accordingly, systems and methods according to the embodiment depicted in FIG. 3 achieve even greater versatility in the case where CPs of two different lengths our impractical, or not allowed. In such cases, data structure 300 will generally resemble existing single-length CP OFDMA structures, however, the length of the single CPs in data structure 300 will be significantly shorter than that of the conventional OFDMA structures. This shorter CP structure is achieved by the preceding activation of the RFoG ONU by CW tone 310, which advantageously allows significantly more throughput on the upstream transmission.

In the exemplary embodiment, CW tone 310 is generated at the modem through modification to the DOCSIS MAC layer of that modem, which may be accomplished through hardware or software. In at least one embodiment, the DOCSIS MAC layer of the MTS is modified, and the MTS instructs the modem to transmit CW tone 310 to the RFoG ONU prior to upstream transmission of customer data, and before symbols were sent into an OFDMA frame. In an embodiment, CW tone 310 is optimized to transmit at a specific frequency in the return band, and/or a specific desired power level. As described above, these embodiments are of particular use for upstream OFDMA transmissions of customer data, however, the person of ordinary skill in the art will understand how the present techniques may be implemented in downstream transmissions as well, or in other digital transmissions that utilize CPs between data blocks/symbols.

The embodiments herein are described above with respect to optical, FTTH, HFC, RFoG, and conventional cable communication networks. These several types of communications systems are discussed by way of example, and are not intended to be limiting. Other types of communication networks and systems are contemplated herein without departing from the scope of the invention. Different protocols for these networks may implement different components to perform similar functions. For example, a headend or hub of the network may utilize an Optical Network Terminal (ONT) or an Optical Line Termination (OLT), and/or an ONU, and one or more optical protocols including without limitation EPON, RFoG, or GPON. Other embodiments that are contemplated include communication systems capable of x-hauling traffic, as well as satellite operator communication systems, Wi-Fi networks, MIMO communication systems, microwave communication systems, short and long haul coherent optic systems, etc. X-hauling is defined herein as any one of or a combination of fronthauling, backhauling, and mid-hauling.

For the embodiments described above, the MTS described above may be substituted with, or additionally include, a termination unit such as an ONT, an OLT, a Network Termination Unit, a Satellite Termination Unit, a cable modem termination system (CMTS), and/or other termination systems which may be collectively referred to herein as "Modem Termination Systems." Similarly, the modem described above may be substituted with, or additionally include, a cable modem (CM), a satellite modem, an Optical Network Unit (ONU), a DSL unit, etc., which are collectively referred to as "modems." Furthermore, the DOCSIS protocol may be substituted with, or further include protocols such as EPON, RFoG, GPON, Satellite Internet Protocol, without departing from the scope of the embodiments herein.

Exemplary embodiments of systems and methods utilizing dual-CPs and reduced-length CPs are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A digital transmission system, comprising:
    a processing unit configured to receive digital data and generate at least one data frame therefrom, the at least one data frame including a series of data blocks; and
    a laser configured to modulate the at least one data frame into a transmitted digital signal,
    wherein the at least one data frame further includes (i) a primary data prefix for the series of data blocks, and (ii) a plurality of secondary data prefixes disposed between adjacent data blocks within the series of data blocks, and
    wherein a length of each of the plurality of secondary data prefixes has a shorter duration than a turn-on time for the laser.

2. The system of claim 1, further comprising a modem in operable communication with the processing unit and the laser, wherein the modem is configured to transmit the at least one data frame onto a digital communication medium in operable communication with the modem.

3. The system of claim 2, further comprising a media access control (MAC) layer.

4. A digital transmission system, comprising:
    a processing unit configured to receive digital data and generate at least one data frame therefrom, the at least one data frame including a series of data blocks;
    a laser configured to modulate the at least one data frame into a transmitted digital signal;
    a modem in operable communication with the processing unit and the laser; and
    a media access control layer (MAC),
    wherein the at least one data frame further includes (i) a primary data prefix for the series of data blocks, and (ii) a plurality of secondary data prefixes disposed between adjacent data blocks within the series of data blocks,
    wherein the modem is configured to transmit the at least one data frame onto a digital communication medium in operable communication with the modem, and
    wherein the MAC layer is configured to instruct the modem to transmit a tone alerting the laser to turn on prior to receiving the at least one data frame.

5. The system of claim 1, wherein the primary data prefix has a length substantially equal to a length of at least one secondary data prefix.

6. The system of claim 1, wherein a length of the primary data prefix is longer than a length of a secondary data prefixes.

7. A digital transmission system, comprising:
    a processing unit configured to receive digital data and generate at least one data frame therefrom, the at least one data frame including a series of data blocks; and
    a laser configured to modulate the at least one data frame into a transmitted digital signal,
    wherein the at least one data frame further includes (i) a primary data prefix for the series of data blocks, and (ii) a plurality of secondary data prefixes disposed between adjacent data blocks within the series of data blocks,
    wherein a length of the primary data prefix is longer than a length of a secondary data prefixes, and
    wherein the length of the primary data prefix has a longer duration than the amount of time needed to turn on the laser.

8. The system of claim 6, wherein the primary data prefix at least two immediately adjacent data prefixes having the same length as the secondary data prefixes.

9. The system of claim 1, wherein the at least one data frame is an orthogonal frequency-division multiple access (OFDMA) frame including a plurality of OFDMA symbols.

10. The system of claim 1, comprising an optical network unit (ONU).

11. The system of claim 10, wherein the ONU is configured for operable communication with a radio frequency over glass (RFoG) network.

12. A digital transmission apparatus, comprising:
a processor configured to receive digital data and generate at least one data frame therefrom for a laser configured to modulate the at least one data frame into a transmitted digital signal; and
a memory in operable communication with the processor, the memory being configured to store therein computer-executable instructions, which, when executed by the processor, cause the processor to structure the at least one data frame into a frame architecture comprising:
a series of data blocks;
a primary data prefix preceding the series of data blocks in time;
a plurality of secondary data prefixes respectively disposed between adjacent pairs of data blocks within the series of data blocks,
wherein a length of each of the plurality of secondary data prefixes has a shorter duration than a turn-on time for the laser.

13. The digital transmission apparatus of claim 12, wherein the at least one digital data frame is an orthogonal frequency-division multiple access (OFDMA) frame including a plurality of OFDMA symbols.

14. The digital transmission apparatus of claim 13, wherein each data block of the series of data blocks includes at least one OFDMA symbol.

15. The digital transmission apparatus of claim 13, wherein the OFDMA frame corresponds to a data over cable service interface specification (DOCSIS) format.

16. The digital transmission apparatus of claim 13, wherein a length of the primary data prefix is longer than a length of each secondary data prefix of the plurality of secondary data prefixes.

17. The digital transmission apparatus of claim 13, wherein a length of the primary data prefix is substantially twice a length of a secondary data prefix of the plurality of secondary data prefixes.

18. The digital transmission apparatus of claim 13, wherein a length of the primary data prefix is substantially the same as a length of each secondary data prefix of the plurality of secondary data prefixes.

19. The digital transmission apparatus of claim 18, wherein the instructions further cause the processor to structure the at least one digital data frame is configured such that a continuous wave tone immediately precedes the primary data prefix.

* * * * *